US008620581B2

(12) United States Patent
Joo et al.

(10) Patent No.: US 8,620,581 B2
(45) Date of Patent: Dec. 31, 2013

(54) TIME SYNCHRONIZATION METHOD FOR VEHICLES HAVING NAVIGATION DEVICE

(75) Inventors: In-One Joo, Daejeon (KR); Sang-Uk Lee, Daejeon (KR); Jae-Hoon Kim, Cheonan (KR)

(73) Assignee: Electronics and Telecommunications Research Institute, Daejeon (KR)

(*) Notice: Subject to any disclaimer, the term of this patent is extended or adjusted under 35 U.S.C. 154(b) by 425 days.

(21) Appl. No.: 12/668,654

(22) PCT Filed: Mar. 27, 2008

(86) PCT No.: PCT/KR2008/001704
§ 371 (c)(1), (2), (4) Date: Jan. 11, 2010

(87) PCT Pub. No.: WO2009/008585
PCT Pub. Date: Jan. 15, 2009

(65) Prior Publication Data

US 2010/0204918 A1 Aug. 12, 2010

(30) Foreign Application Priority Data

Jul. 11, 2007 (KR) ........................ 10-2007-0069805

(51) Int. Cl.
*G01C 21/00* (2006.01)
*G07C 3/00* (2006.01)
*G07C 5/00* (2006.01)
*G07C 7/00* (2006.01)

(52) U.S. Cl.
USPC ........ 701/478; 701/400; 701/487.5; 701/476; 701/479; 701/518

(58) Field of Classification Search
None
See application file for complete search history.

(56) References Cited

U.S. PATENT DOCUMENTS

| | | | | |
|---|---|---|---|---|
| 5,841,396 | A | 11/1998 | Krasner | |
| 6,763,241 | B2 * | 7/2004 | Gous et al. | 455/502 |
| 7,457,200 | B2 * | 11/2008 | Pikula et al. | 368/10 |
| 2002/0173888 | A1 * | 11/2002 | Shelton et al. | 701/35 |
| 2003/0109264 | A1 * | 6/2003 | Syrjarinne et al. | 455/456 |
| 2003/0109972 | A1 * | 6/2003 | Tak | 701/29 |
| 2004/0203842 | A1 * | 10/2004 | Hanninen et al. | 455/456.1 |
| 2004/0213295 | A1 | 10/2004 | Fehr | |

FOREIGN PATENT DOCUMENTS

| | | | |
|---|---|---|---|
| JP | 03-061893 | A | 3/1991 |
| JP | 2001-116821 | A | 4/2001 |
| KR | 1999-0009129 | | 2/1999 |
| KR | 2001-0056454 | A | 7/2001 |
| KR | 2001-0062101 | A | 7/2001 |
| KR | 2004-0081509 | A | 9/2004 |
| KR | 10-0516895 | | 9/2005 |
| KR | 2006-0040786 | A | 5/2006 |
| KR | 10-0661557 | | 12/2006 |

* cited by examiner

*Primary Examiner* — Bhavesh V Amin
(74) *Attorney, Agent, or Firm* — Rabin & Berdo, P.C.

(57) ABSTRACT

Provided is a method of performing time synchronization using a navigation device. The method includes: (a) performing time synchronization between a GPS satellite and a navigation device by receiving GPS signals by a navigation device from at least one GPS satellite; (b) establishing an interface between the navigation device and a time-using device; (c) setting conditions for transmitting time information to the navigation device; and (d) performing time synchronization between the navigation device and the time-using device by transmission of time information from the navigation device to the time-using device.

15 Claims, 4 Drawing Sheets

TIME SYNCHRONIZATION METHOD FOR VEHICLES HAVING NAVIGATION DEVICE

TECHNICAL FIELD

The present invention relates to a method for providing more accurate time information to an apparatus, such as a clock or a black box that requires time information, by using a navigation device or the like installed in a vehicle.

BACKGROUND ART

A navigation device is a device that determine its own location information and other parameters in real-time via the American Global Positioning System (GPS). Other similar systems are GLONASS (Russia), and Galileo (Europe). Such navigation device is also referred to as a GPS system, a navigation system, or the like.

Recently, various apparatuses for vehicles using navigation devices have been introduced. These apparatuses may provide only basic audio information for safe driving such as information on frequent accident zones, over-speed zones, and road details.

In the past, GPS navigation devices were prohibitive mainly because of their high costs. Nowadays, however, the costs of GPS navigation devices have reduced substantially, and thus they are frequently installed on many vehicles.

The present invention is derived from studies regarding IT new growth power core technology development business, conducted by the Ministry of Information and Communication and the Institute of Information Technology Association. [Reference No.: 2007-S-301-01, Title: IT Strategic Technology Development]

Most digital clocks, such as a clock installed on a vehicle, are driven by using a cheap crystal oscillator. Since the vibration period of the oscillator is easily influenced by external factors such as electronic noise or heat, a time error increases as time goes by.

The easiest method increasing its stability is to replace the digital clocks with atomic clocks using cesium or rubidium. However, these atomic clocks are very expensive, and thus are not widely used as compared to general digital clocks. Thus, since most of the clocks installed on vehicles at present use a cheap crystal oscillator, the time error increased as time goes by. Accordingly, the users must directly periodically correct time information, and accuracy and precision of users' corrections are limited.

DISCLOSURE OF INVENTION

Technical Problem

The present invention provides a method of performing time synchronization using a navigation device so that accurate and precise time information can be provided through a simple interface between time-using devices. More particularly, the present invention provides a method of using time according to an internal clock of a time-using device when time synchronization between the time-using device and the navigation device is broken.

The present invention also provides a time synchronization black box installed in a time synchronization navigation system, a navigation device, a clock device, and a transporting apparatus for using the above-described method of performing time synchronization.

Technical Solution

According to an aspect of the present invention, there is provided a method of performing time synchronization using a navigation device, the method including: (a) performing time synchronization between a GPS satellite and a navigation device by receiving GPS signals by a navigation device from at least one GPS satellite; (b) establishing an interface between the navigation device and a time-using device; (c) setting conditions for transmitting time information to the navigation device; and (d) performing time synchronization between the navigation device and the time-using device by transmission of time information from the navigation device to the time-using device. When time synchronization between the time-using device and the navigation device is cut off because the navigation device is not connected to the GPS satellite, the method may further include (e) changing the time-using device to an inner clock generation mode to generate a clock according to its inner clock.

If the navigation device receives GPS signals from the GPS satellite again, the method may further include: (f) performing time synchronization again between the GPS satellite and the navigation device by receiving the GPS signals by the navigation device from the GPS satellite; and (g) performing time synchronization again between the navigation device and the time-using device by the transmission of time information from the navigation device to the time-using device.

The method may further include: completing the interface between the navigation device and the time-using device.

The GPS satellite may be one of a GPS satellite, a GLONASS satellite, or a Galileo satellite.

The time-using device may be installed in a transporter and the transporter may be a general vehicle or a ship.

The time-using device may be a clock device installed in the transporter or a black box installed in the transporter.

The interface may be a wired or wireless interface.

The wired interface may use one of USB, RS-232C, or IEEE 1394.

The wireless interface may use one of bluetooth, infrared rays, or UWB.

The configuration may include setting the period in which the time information is transmitted.

The conditions may be reset whenever necessary after (d) operation.

According to another aspect of the present invention, there is provided a time synchronization navigation system including: a navigation device receiving GPS signals from a GPS satellite so as to generate time information, and transmitting the time information; an interface used to transmit the time information between the navigation device and a time-using device; and the time-using device receiving the time information from the navigation device through the interface so as to use the time information.

The time information may be universal coordinated time (UTC).

The interface may be a wired or wireless interface.

The wired interface may use one of USB, RS-232C or IEEE1394.

The wireless interface may use one of blue-tooth, infrared rays or UWB.

The time-using device may be a black box installed in a clock device or a transporter.

According to another aspect of the present invention, there is provided a time synchronization navigation device, including: a GPS signal receiving unit receiving GPS signals from a GPS satellite; a condition setting unit setting conditions for receiving the GPS signals; a time information generating unit generating time information from the GPS signal; and a time information transmitting unit transmitting the generated time information to the outside.

According to another aspect of the present invention, there is provided a clock device, including: a time information receiving unit receiving time information from a navigation device; a clock generating unit generating its own time information; and a controller operating so as to use time information from the clock generating unit when the time information receiving unit which uses the time information transmitted from the navigation device cannot receive the time information anymore.

The clock device may further include a display unit displaying the time information.

The clock device may be installed in a transporter.

According to another aspect of the present invention, there is provided a time synchronization black box including: a time information receiving unit receiving time information from a navigation device; an event information receiving unit receiving event information when a transporter has problems; a clock generating unit generating its own time information; and a controller using the time information generated by the clock generating unit when the time information receiving unit which uses the time information transmitted from the navigation device cannot receive time information anymore, and remembering the time information when the event information receiving unit receives the event information.

Advantageous Effects

According to the present invention, accurate time information can be obtained through a navigation device and a simple wired/wireless interface in a transporting apparatus such as personal vehicles and public transportations.

Also, recently, since accurate time information is used in black boxes for vehicles used to accurately determine accident circumstances and to decrease traffic accidents, a black box for vehicles can be used to accurately review the situation of a vehicle at the time of an accident.

While the present invention has been particularly shown and described with reference to exemplary embodiments thereof, it will be understood by one of ordinary skill in the art that various changes in form and details may be made therein without departing from the spirit and scope of the present invention as defined by the following claims.

DESCRIPTION OF DRAWINGS

The above and other features and advantages of the present invention will become more apparent by describing in detail exemplary embodiments thereof with reference to the attached drawings in which.

MODE FOR INVENTION

The present invention will now be described more fully with reference to the accompanying drawings, in which exemplary embodiments of the invention are shown. In the description of the present invention, if it is determined that a detailed description of commonly-used technologies or structures related to the invention may unnecessarily obscure the subject matter of the invention, the detailed description will be omitted. Also, since some terms are defined in consideration of the functions of the present invention, they may vary according to users' intentions or practice. Hence, the terms must be interpreted based on the contents of the entire specification.

Figure 1:
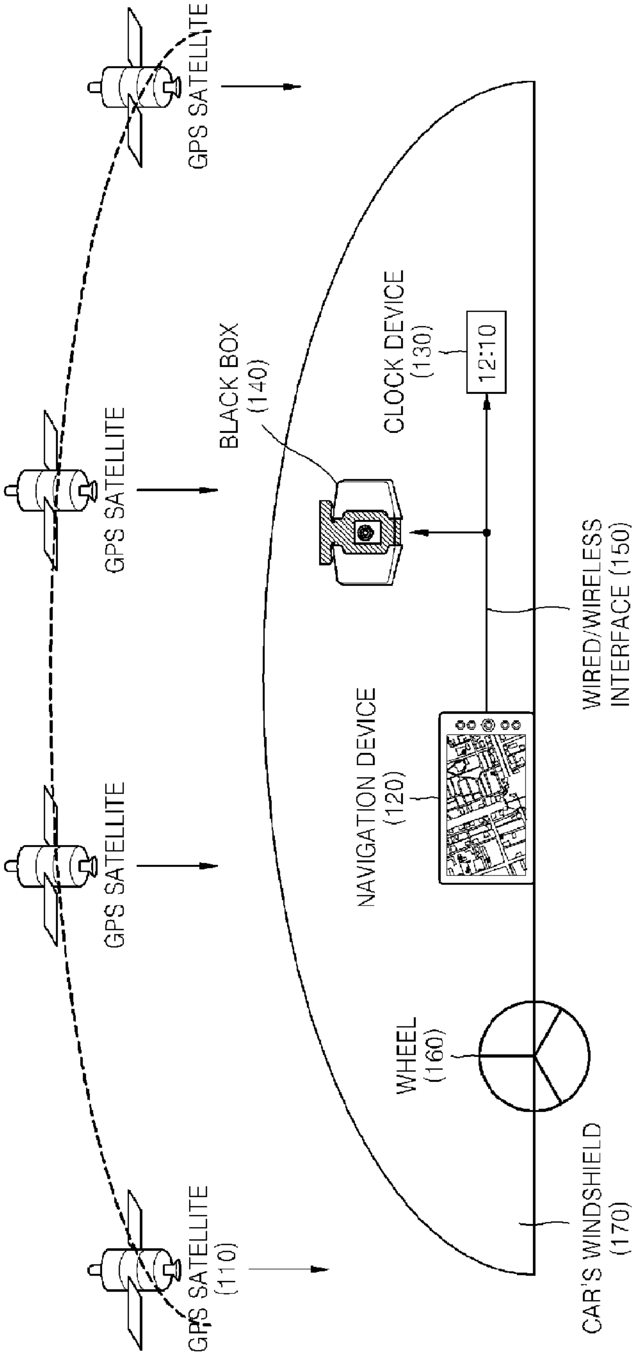
FIG. 1 is a view illustrating a connecting structure in which time synchronization between a navigation device and an inner device of a vehicle is performed.

FIG. 1 is a view illustrating a connecting structure in which time synchronization between a navigation device and an inner device of a vehicle is performed.

A GPS satellite 110 may use the U.S.A. Global Positioning System (GPS), GLONASS system (Russia), or Galileo system (EU).

A navigation device 120 installed on a vehicle receives signals from the GPS satellite 110 to generate not only basic information for determining location information but also universal time coordinated (UTC) information, which might have errors from tens to hundreds of nanoseconds. UTC is used as time information of a clock device 130 installed on a vehicle and a black box 140 for vehicles through an interface 150, which may be a wired interface such as universal serial bus (USB), RS-232 or IEEE 1394, or a wireless interface such as bluetooth, infrared rays, ultra-wide bandwidth (UWB), or the like.

The navigation device 120 is also referred to as a navigation system usually used for vehicles.

The clock device 130 can be easily found on vehicles. However, clock devices for vehicles or general digital clocks generate a clock by using a crystal oscillator. The vibration period of the crystal oscillator is influenced by external factors, and thus the clock device generates a time error, that increases as time goes by, thereby gradually decreasing the time accuracy.

The method of performing time synchronization and the navigation device according to the present invention will now be described in more detail.

Figure 2:
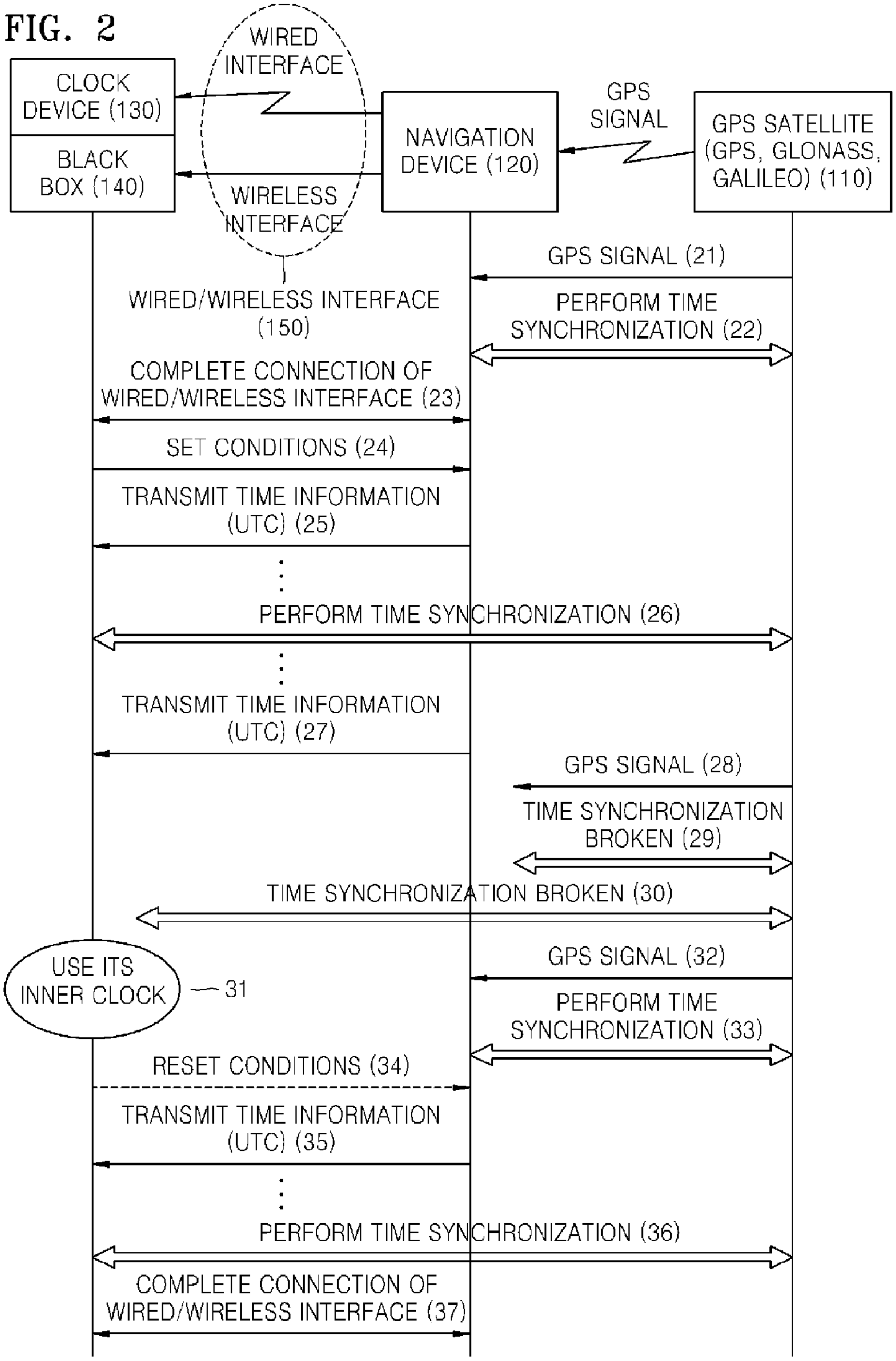
FIG. 2 is a view illustrating a process of sequentially performing time synchronization between a navigation device and a time-using device according to an embodiment of the present invention.

FIG. 2 is a view illustrating a process of sequentially performing time synchronization between a navigation device and a time-using device according to an embodiment of the present invention.

First, the GPS satellite 110 transmits GPS signals to the navigation device 120 installed on a vehicle, or the like. The navigation device 120 receives the GPS signals to calculate its own location and a time error between the GPS satellite 110 and the navigation device 120. UTC is generated on the basis of the time error so as to perform time synchronization between the GPS satellite 110 and the navigation device 120 (22).

The navigation device 120 is connected to a time-using device such as the clock device 130 or the blackbox 140 through the wired/wireless interface 150 (23).

A representative example of the wired interface may be USB that is simple and convenient to use. In addition to the USB, a serial interface such as RS-232C or IEEE 1394 can be used as the wired interface.

Examples of the wireless interface may be bluetooth, infrared rays, and UWB

The navigation device 120 is connected to the clock device 130 or the black box 140 through the wired/wireless interface 150, and the connection is finished according to a protocol that is defined in advance. Then, setting of conditions, for example, transmission period of time information, or the like, is performed (24).

Next, the generated UTC time information is transmitted (25).

Thus, UTC time synchronization between the time-using devices such as the GPS satellite 110, the navigation device 120 and the clock device 130 or the black box 140 is performed. After this, the time information is periodically transmitted according to the above conditions (27).

The time synchronization is broken when the navigation device 120 cannot receive the GPS signals from the GPS satellite 110. For example, since the GPS signals are transmitted wirelessly, if a vehicle on which the navigation device 120 is installed enters an underground parking lot, a tunnel, or the like, the navigation device 120 cannot receive the GPS signals anymore (28). As a result, the time synchronization between the GPS satellite 110 and the navigation device 120 is broken (29), and also, the time synchronization between the GPS satellite 110 and the clock device 130 or the vehicle black box 140 is broken (30).

In this case, the clock device 130 or the black box 140 operates according to its internal clock according to an embodiment of the present invention. In this case, the internal clock generally represents a clock using a cheap crystal oscillator. Since the vibration period of the crystal oscillator is easily influenced by external factors such as electronic noise or heat, a time error increases in time.

However, in general, the clock device 130 and the black box 140 for vehicles mostly provide meaningful information to a driver and a passenger during driving in open areas. That is, when a vehicle is parked in an underground area, it is not important that the navigation device 120 installed on the vehicle cannot receive GPS signals. Also, since the time synchronization is broken only for a while, for example, while the vehicle is passing through a tunnel, even though the vehicle uses its internal clock, a time error generated during this time is negligible.

Afterwards, when the navigation device 120 installed on the vehicle receives the GPS signals again (32), time synchronization is performed again (33), and the navigation device 120 transmits the UTC time information (35). Finally, time synchronization is performed between the GPS satellite 110 and the navigation device 120, or between the navigation device 120 and the clock device 130 or the black box 140.

In this case, resetting of conditions such as period of time information transmitted from the clock device 130 and the vehicle black box 140 to the navigation device can be performed whenever necessary (34). The connection of the wired/wireless interface can be finished according to protocol defined in each interface (37).

Figure 3:
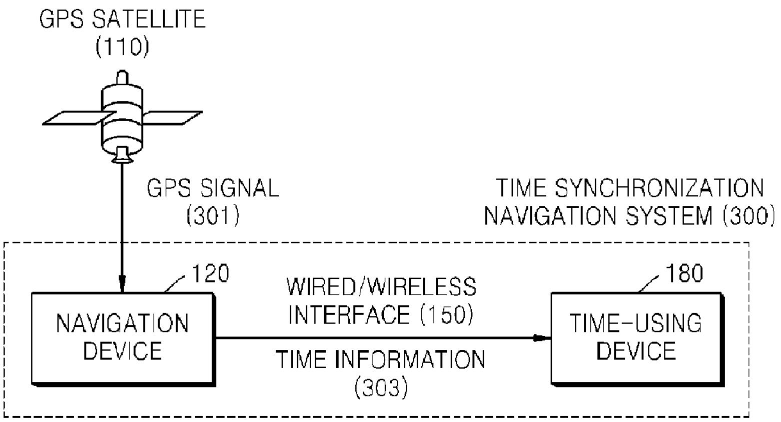
FIG. 3 is a block diagram illustrating a navigation system using time synchronization according to an embodiment of the present invention.

FIG. 3 is a block diagram illustrating a navigation system using time synchronization according to an embodiment of the present invention.

Referring to FIG. 3, a time synchronization navigation system 300 according to the present invention is shown with a dotted line.

A navigation device 120 receives GPS signals 301 from a GPS satellite 110 so as to perform time synchronization. The navigation device 120 can communicate with a time-using device 180 through a wired/wireless interface 150 and provides time information 303 to the time-using device 180 so as to perform time synchronization.

As described above, a representative example of the time-using device 180 may be a clock device 130 or a black box device 140 installed on a vehicle. However, this is only an example, and the time-using device 180 may be any device that requires accurate time. Also, the present invention is not limited to time-using devices installed on vehicles.

In another embodiment, accurate time information is required by ships or another transport means. Also, the black box device 140 is not limited to a vehicle, and may be any black box device installed on any transportations means such as a plane, a ship, or the like.

Figure 4:
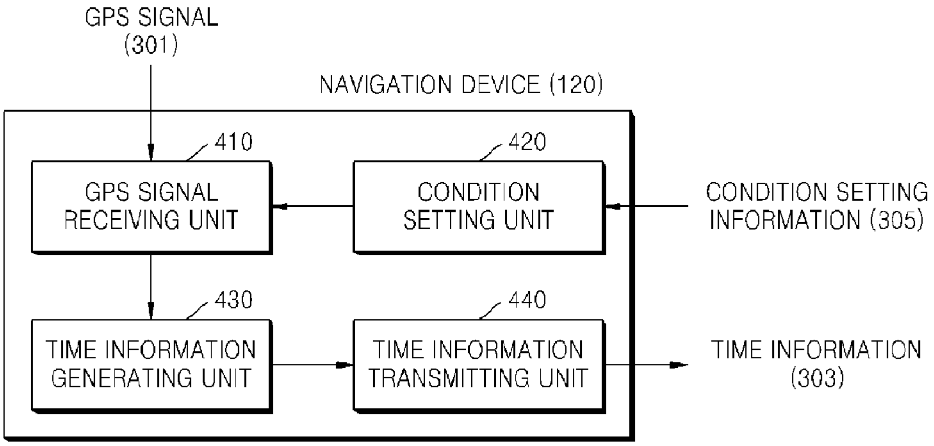
FIG. 4 is a block diagram illustrating in detail a navigation device using time synchronization according to an embodiment of the present invention.

FIG. 4 is a block diagram illustrating in detail a navigation device using time synchronization according to an embodiment of the present invention.

A navigation device 120 according to the present invention includes a GPS signals receiving unit 410, a condition setting unit 420, a time information generating unit 430, and a time information transmitting unit 440.

The GPS signal receiving unit 410 receives a GPS signal 301 transmitted from a GPS satellite.

The condition setting unit 420 receives condition setting information 305 from an external device so as to set conditions, for example, the period of the following GPS signal that should be received, or the like. The GPS signal receiving unit 410 receives the GPS signal 301 according to the conditions.

The time information generating unit 430 receives the GPS signal 301 from the GPS signal receiving unit 410 so as to generate time information such as UTC. The generated time information 303 is transmitted to an external device such as a time-using device connected to a navigation device through the time information transmitting unit 440.

Figure 5:
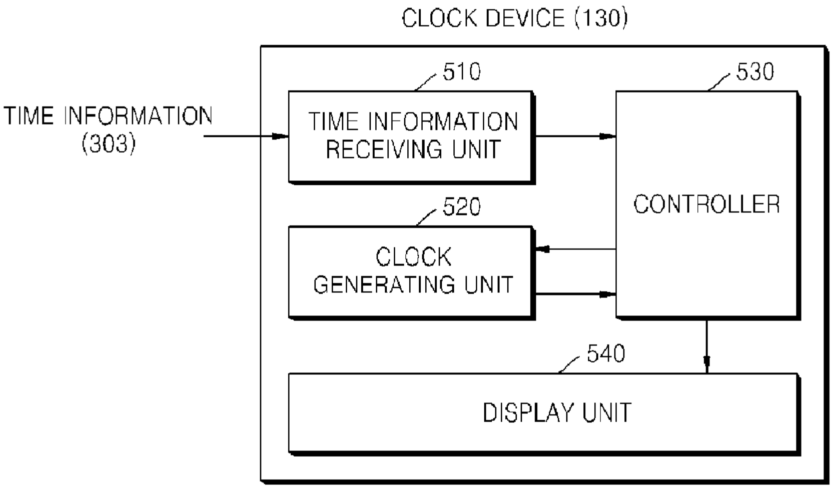
FIG. 5 is a block diagram illustrating in detail a clock device using time information transmitted from a navigation device according to an embodiment of the present invention.

FIG. 5 is a block diagram illustrating in detail a clock device using time information transmitted from a navigation device according to an embodiment of the present invention.

A clock device 130 is connected to a navigation device 120 through a wired/wireless interface, and thus, may be installed in a transportation means in which the navigation device is installed.

The clock device 130 includes a time information receiving unit 510, a clock generating unit 520, a controller 530, and selectively a display unit 540

The time information receiving unit 510 receives the time information 303 transmitted from the navigation device 120. The time information 303 is displayed on the display unit 540 through the controller 530. If an external device that can display time information is separately included, the time information 303 can be transmitted to the external display apparatus through an appropriate interface.

The clock generating unit 520 is useful when the contact between the GPS satellite and the navigation device is cut off due to environmental changes. That is, when the time information 303 is not transmitted anymore from the navigation device 120, the controller 303 uses time information from the clock generating unit 520. Since the controller 303 uses time information only temporarily, even though the controller 303 uses the time information generated from within the controller 303, the time error is negligible.

The display unit 540 is an apparatus that displays time and generally includes a LED displayer. However, the present invention is not limited thereto, and any type of display apparatus capable of displaying time may be used. The display unit 540 is optional, and a separate display apparatus place outside the clock device 130 may be used.

Figure 6:
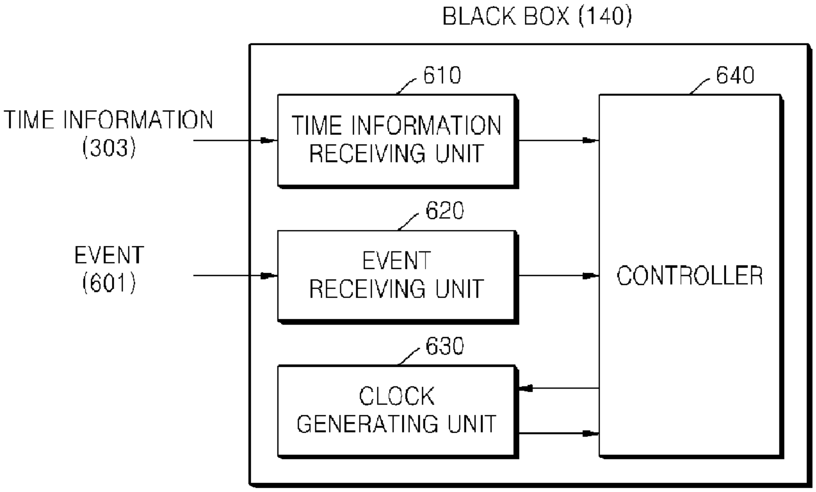
FIG. 6 is a block diagram illustrating in detail a black box for a transporting apparatus using time information transmitted from a navigation device according to an embodiment of the present invention.

FIG. 6 is a block diagram illustrating in detail a black box for a transporting apparatus using time information transmitted from a navigation device according to an embodiment of the present invention.

The black box is usually used to accurately make a diagnosis of an accident by capturing information on the car or surroundings at the time of the accident. To say nothing of the importance of the black box in a plan or a ship, a tendency to use an accurate accident information is increasing by installing the black box in the car. In particular, it is important that the black box consistently monitors time information for capturing the details of the accident.

A black box 140 according to the present invention includes a time information receiving unit 610, an event receiving unit 620, a clock generating unit 630 and a controller 640.

The time information receiving unit 610 receives time information 303 from a navigation device 120. The received time information 303 is stored in a storage medium such as a memory so as to consistently monitor in the controller 640.

The event receiving unit 620 receives event information 601 such as occurrence of an accident and notices the occurrence of the event to the controller 640. The controller 640 receives the notice from the event receiving unit 620 and checks the time when the event occurred and stores the time separately.

The clock generating unit 630 generates time information by its inner clock in order to generate the time information continuously when the time information 303 is cut off from the navigation device. As described above, since a possibility when the time information 303 is not received is high in a representatively short time or when a possibility when an event does not occur is high, a time error generated by the clock generating unit 630 is negligible.

According to the present invention, accurate time information can be obtained through a navigation device and a simple wired/wireless interface in a transporting apparatus such as personal vehicles and public transportations.

Also, recently, since accurate time information is used in black boxes for vehicles used to accurately determine accident circumstances and to decrease traffic accidents, a black box for vehicles can be used to accurately review the situation of a vehicle at the time of an accident.

While the present invention has been particularly shown and described with reference to exemplary embodiments thereof, it will be understood by one of ordinary skill in the art that various changes in form and details may be made therein without departing from the spirit and scope of the present invention as defined by the following claims.

The invention claimed is:

1. A method of performing time synchronization using a navigation device, comprising:

(a) performing time synchronization between a GPS satellite and the navigation device by receiving GPS signals at the navigation device from at least one GPS satellite;

(b) establishing an interface between the navigation device and a time-using device, the time-using device being a clock device installed in a transporter or a black box installed in a transporter;

(c) setting a time period for transmitting time information to the navigation device;

(d) performing time synchronization between the navigation device and the time-using device by transmission of current time information from the navigation device to the time-using device periodically according to the set time period, and (e) changing from the time-using device to an internal clock generation mode to generate a clock according to its internal clock, when time synchronization between the time-using device and the navigation device is cut off because the GPS satellite is not communicating with the navigation device.

2. The method of claim 1, wherein when the navigation device receives GPS signals from the GPS satellite again, the method further comprises:

(f) performing time synchronization again between the GPS satellite and the navigation device by receiving the GPS signals by the navigation device from the GPS satellite; and (g) performing time synchronization again between the navigation device and the time-using device by the transmission of current time information from the navigation device to the time-using device.

3. The method of claim 1, further comprising: completing the interface between the navigation device and the time-using device.

4. The method of claim 1, wherein the GPS satellite is one of GPS, GLONASS, or Galileo satellites.

5. The method of claim 1, wherein the time-using device is installed in a transporter, and the transporter is a general vehicle or a ship.

6. The method of claim 1, wherein the interface is a wired or wireless interface.

7. The method of claim 6, wherein the wired interface uses one of USB, RS-232C, and IEEE 1394.

8. The method of claim 6, wherein the wireless interface uses one of bluetooth, infrared rays, and UWB.

9. The method of claim 1, wherein the time period is reset whenever necessary after (d) operation.

10. A time synchronization navigation system, comprising:

a navigation device receiving GPS signals from a GPS satellite so as to generate current time information, and transmitting the current time information;

an interface configured to transmit the current time information between the navigation device and a time-using device, the time-using device being a clock device installed in the transporter or a black box installed in the transporter; and the time-using device receiving the current time information periodically according to a preset time period from the navigation device through the interface so as to perform time synchronization between the navigation device and the time-using device with the current time information.

11. The time synchronization navigation system of claim 10, wherein the current time information is universal coordinated time (UTC).

12. The time synchronization navigation system of claim 10, wherein the interface is a wired or wireless interface.

13. The time synchronization navigation system of claim 12, wherein the wired interface uses one of USB, RS-232C, and IEEE1394.

14. The time synchronization navigation system of claim 12, wherein the wireless interface uses one of blue-tooth, infrared rays, and UWB.

15. A clock device, comprising:

a time information receiving unit receiving first current time information from a navigation device periodically according to a preset time period so as to perform time synchronization between the navigation device and the clock device, the clock device being installed in a transporter;

a clock generating unit generating second current time information;

a controller operating so as to use the second current time information from the clock generating unit when the time information receiving unit cannot receive the first current time information any more; and a display unit displaying at least one of the first current time information and the second current time information.

* * * * *